(12) United States Patent
Ohishi et al.

(10) Patent No.: US 10,417,177 B2
(45) Date of Patent: Sep. 17, 2019

(54) INFORMATION PROCESSING APPARATUS, INFORMATION PROCESSING SYSTEM, AND INFORMATION MANAGEMENT METHOD

(71) Applicant: FUJITSU LIMITED, Kawasaki-shi, Kanagawa (JP)

(72) Inventors: Kei Ohishi, Chigasaki (JP); Masanori Kimura, Mishima (JP); Sugio Watanabe, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 336 days.

(21) Appl. No.: 15/245,633

(22) Filed: Aug. 24, 2016

(65) Prior Publication Data
US 2017/0060883 A1    Mar. 2, 2017

(30) Foreign Application Priority Data

Sep. 2, 2015   (JP) .................................. 2015-173047

(51) Int. Cl.
   G06F 17/30   (2006.01)
   G06F 16/11   (2019.01)
   G06F 16/178  (2019.01)

(52) U.S. Cl.
   CPC ........ *G06F 16/116* (2019.01); *G06F 16/1794* (2019.01)

(58) Field of Classification Search
   CPC .............................................. G06F 17/30076
   See application file for complete search history.

(56) References Cited

U.S. PATENT DOCUMENTS

| | | | |
|---|---|---|---|
| 4,771,459 A | | 9/1988 | Jansen |
| 2005/0021556 A1* | | 1/2005 | Noguchi ................. G06F 21/10 |
| 2005/0256740 A1* | | 11/2005 | Kohan .................. G06F 19/324 |
| | | | 705/2 |
| 2006/0026156 A1* | | 2/2006 | Zuleba ................ G06F 21/6227 |
| 2007/0294253 A1* | | 12/2007 | Strub .................... H04L 63/102 |
| 2013/0080721 A1* | | 3/2013 | Tomiyama ............ G06F 3/0644 |
| | | | 711/161 |
| 2013/0262863 A1 | | 10/2013 | Yoshino et al. |

(Continued)

FOREIGN PATENT DOCUMENTS

| | | |
|---|---|---|
| JP | 61-252730 A | 11/1986 |
| JP | 06-004165 | 1/1994 |

(Continued)

OTHER PUBLICATIONS

Japanese Office Action dated Mar. 2, 2019 for corresponding Japanese Patent Application No. 20154-173047, with English Translation, 6 pages.

*Primary Examiner* — Syed H Hasan
(74) *Attorney, Agent, or Firm* — Fujitsu Patent Center

(57) ABSTRACT

A conversion unit acquires collected information from a plurality of customer servers and performs a plurality of conversions different with respect to each of the customer server on the acquired collected information to generate conversion data. An identification unit performs identification on information contained in each set of collected information in a state where, with respect to the conversion data generated by the conversion unit, information before the conversion performed by the conversion unit is secreted.

4 Claims, 10 Drawing Sheets

(56) References Cited

U.S. PATENT DOCUMENTS

| | | | |
|---|---|---|---|
| 2014/0013065 A1* | 1/2014 | Arakawa | G06F 3/0604 |
| | | | 711/154 |
| 2014/0298030 A1 | 10/2014 | Akiyama et al. | |
| 2015/0186618 A1* | 7/2015 | Poorvin | G16H 10/20 |
| | | | 705/3 |

FOREIGN PATENT DOCUMENTS

| | | |
|---|---|---|
| JP | 2003-173376 | 6/2003 |
| JP | 2012-123614 A | 6/2012 |
| JP | 2014-192707 A | 10/2014 |

* cited by examiner

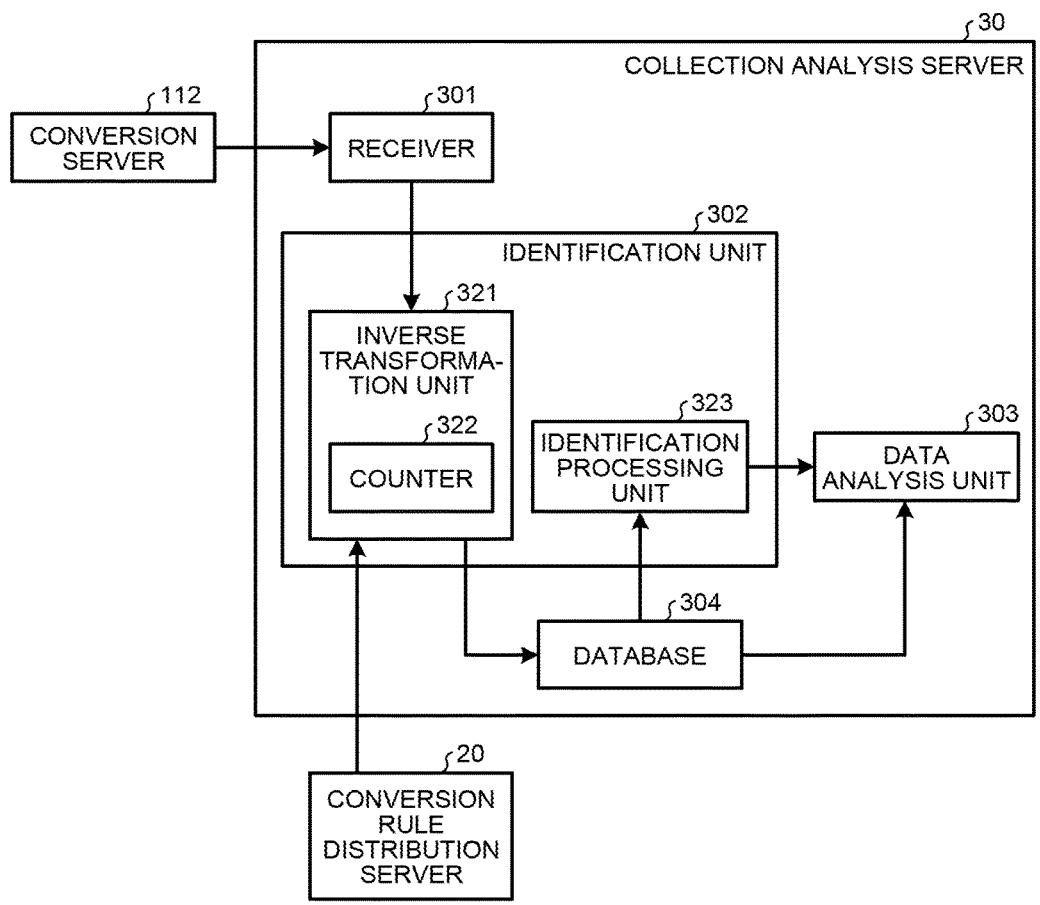

FIG.5

| COMPANY NAME | DATE OF TRANSMIS-SION | COUNTER VALUE | DATA IDENTIFIER |
|---|---|---|---|
| COMPANY A | 20150601 | 50 | AXXX |
| COMPANY B | 20150623 | 100 | BYYY |
| COMPANY C | 20150524 | 27 | CZZZ |

FIG.6

Table 401:

| BUSINESS | PURCHASER | AGE | GENDER | DATE | STORE | WEATHER | NAME OF ITEM |
|---|---|---|---|---|---|---|---|
| CONVENIENCE STORE | TARO YAMAMOTO | 20 | MALE | 2015/6/2 | KAMATA | FINE | RICE BALL |
| CONVENIENCE STORE | ICHIRO SATO | 30 | MALE | 2015/6/4 | SINAGAWA | FINE | COFFEE |
| ... | ... | ... | ... | ... | ... | ... | ... |

411, 412

Table 402:

| BUSINESS | PURCHASER | AGE | GENDER | DATE | STORE | WEATHER | NAME OF ITEM |
|---|---|---|---|---|---|---|---|
| RENTAL | TARO YAMAMOTO | 20 | MALE | 2015/6/2 | KAMATA | FINE | DVD |
| RENTAL | HANAKO SUZUKI | 30 | FEMALE | 2015/6/3 | OIMACHI | FINE | BOOK |
| ... | ... | ... | ... | ... | ... | ... | ... |

421, 422

Table 403:

| BUSINESS | PURCHASER | AGE | GENDER | DATE | STORE | WEATHER | NAME OF ITEM |
|---|---|---|---|---|---|---|---|
| CONVENIENCE STORE | AAA | 20 | MALE | 2015/6/2 | KAMATA | FINE | RICE BALL |
| RENTAL | AAA | 20 | MALE | 2015/6/2 | KAMATA | FINE | DVD |
| ... | ... | ... | ... | ... | ... | ... | ... |

```
                                                   ╭─330
┌─────────────────────────────────────────────────┐
│                ANALYSIS REPORT                  │
│                                                 │
│                                                 │
│   RESULT OF ANALYSIS:                           │
│                                                 │
│   PERSON WHO OFTEN BUYS A RICE BALL AT          │
│   A CONVENIENCE STORE TENDS TO BUY A            │
│   DVD AT A RENTAL VIDEO SHOP.                   │
│                                                 │
│                                                 │
└─────────────────────────────────────────────────┘
```

INFORMATION PROCESSING APPARATUS, INFORMATION PROCESSING SYSTEM, AND INFORMATION MANAGEMENT METHOD

CROSS-REFERENCE TO RELATED APPLICATION

This application is based upon and claims the benefit of priority of the prior Japanese Patent Application No. 2015-173047, filed on Sep. 2, 2015, the entire contents of which are incorporated herein by reference.

FIELD

The embodiment discussed herein is related to an information processing apparatus, an information processing system, and an information management method.

BACKGROUND

The volume of data to be dealt with in the society is rapidly increasing recently because of the broad use of the Internet, the reduction in price of information processing devices, and the broad use of information terminal devices, such as mobile phones. Various companies therefore perform information management using data centers. Various types of information are accumulated in data centers and the use of a variety of information stored in the data centers provides information useful to improve the business operations and useful for stable operations in various companies and information useful for businesses. To provide the above-described services, it is preferable that data be collected from systems with respect to various kinds of businesses and a large number of customers.

As described above, when information accumulated in the data centers is acquired, information that is not preferably provided to the outside for security reasons may be contained. To realize the above-described services, it is desirable that security be ensured and information on customers accumulated in the data centers be acquired.

As a method of strengthening the security, there is a managing method according to access authority to, for example, manage connection to a network or an information processing apparatus with respect to each user or an information processing apparatus or put a limitation on referring to to or updating the files in the information processing apparatus with respect to each user.

When information of the data centers is collected, operations to manually secrete specific information is complicated and it is also difficult to ensure operations without leakage. Furthermore, because the system consists of a large number of devices, it takes an enormous amount of time to manually perform the process of collecting needed information from the devices, keeping consistency of the collected information, and secreting the information, which requires a considerable amount of energy.

Collecting customer information that is converted according to an application programming interface (API) for conversion to protect secrecy can be assumed here. To provide data while ensuring security, there is a conventional technology in which a statistical analysis on the medical conditions of the patients is performed according to data for analyzing the medical conditions of patients accumulated in a server, a secreting process is performed on the result of analysis, and the secreted result of analysis is transmitted to a terminal device, and the result of the analysis is provided by and checked on the terminal device.

Patent Document 1: Japanese Laid-open Patent Publication No. 2003-173376

When customer information is collected from the various data centers and if APIs different from one another are used at various data centers, respectively, there is a risk that collected information cause a mismatch. Particularly when data centers are set in various countries, different APIs would be highly likely to be used due to the different in language. Sets of information accumulated in the respective data centers are relevant to one another and therefore secreting information according to each server or center makes it difficult to grasp the relevance among the sets of information.

SUMMARY

According to an aspect of an embodiment, an information processing apparatus includes: a conversion unit that acquires collected information from a plurality of information providing sources and that performs a plurality of conversions different with respect to each of the information providing sources on the acquired collected information to generate conversion data; and an identification unit that performs identification on information contained in each set of collected information in a state where, with respect to the conversion data generated by the conversion unit, information before the conversion performed by the conversion unit is secreted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a table of an exemplary transmission information management table;

FIG. 4 is a block diagram of a collection analysis server according to the embodiment;

FIG. 5 is a table of an exemplary collected information management table;

FIG. 6 is a diagram for explaining an identification process performed by an identification processing unit;

FIG. 7 is a diagram representing an exemplary analysis report;

DESCRIPTION OF EMBODIMENT

Preferred embodiments of the present invention will be explained with reference to accompanying drawings. The following embodiment is not to be construed as limiting the invention.

Figure 1:
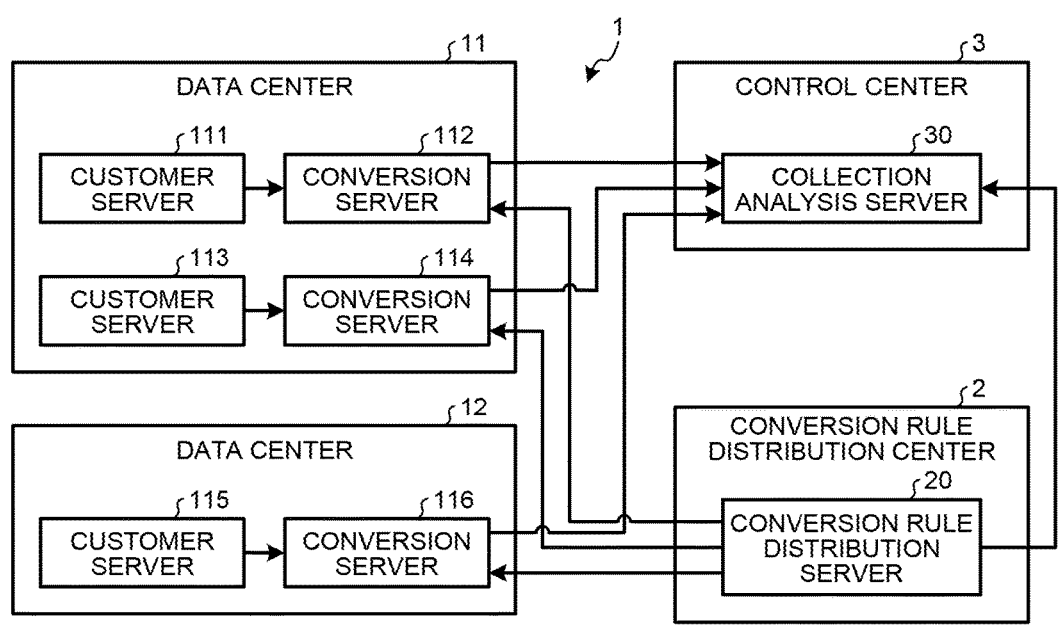
FIG. 1 is a configuration diagram of an information processing system according to an embodiment of the present invention.

FIG. 1 is a configuration diagram of an information processing system according to the embodiment. As represented in FIG. 1, an information processing system 1 according to the embodiment includes data centers 11 and 12, a control center 3, and a conversion rule distribution center 2. The data center 11 and the data center 12 are set in different countries, respectively. The control center 3 is independent of the conversion rule distribution center 2 and thus does not know the conversion rules distributed by the conversion rule distribution center 2, which will be described below.

The data center 11 includes customer servers 111 and 113 and conversion servers 112 and 114. The customer server 111 is a server of a system of Company A. The customer server 113 is a server of a system of Company B. The conversion server 112 corresponds to the customer server 111 and the conversion server 114 corresponds to the customer server 113.

The data center 12 includes a customer server 115 and a conversion server 116. The customer server 115 is a server of a system of Company C. The conversion server 116 corresponds to the customer server 115.

The customer servers 111, 113 and 115 manage data on customers. For example, when Company A runs convenience stores, the customer server 111 manages, for example, the information on the business of Company A, the name, age, gender, etc., of a purchaser who purchased items, information of the date and store of the purchase, the weather on the purchase, the names of the purchased items. The data managed by the customer servers 111, 113 and 115 is referred to as "business operation data". The business operation data serves as exemplary "collected information". FIG. 1 represents only one customer server with respect to the system of each company; however, practically, multiple customer servers may be set.

The conversion servers 112, 114, and 116 are set to correspond to different customer systems. In other words, in the information processing system 1, one conversion server is assigned to one customer system. The conversion servers 112, 114 and 116 serve as an exemplary "data conversion apparatus". Because the conversion servers 112, 114 and 116 perform the same operations, only the conversion server 112 will be exemplified and described below.

The conversion server 112 acquires information that is managed by the customer server 111. The conversion server 112 then converts the acquired information and secretes information to be secreted among the acquired information. The conversion server 112 transmits the converted information to a collection analysis server 30 of the control center 3. The details of the conversion server 112 will be described with reference to FIG. 2.

Figure 2:
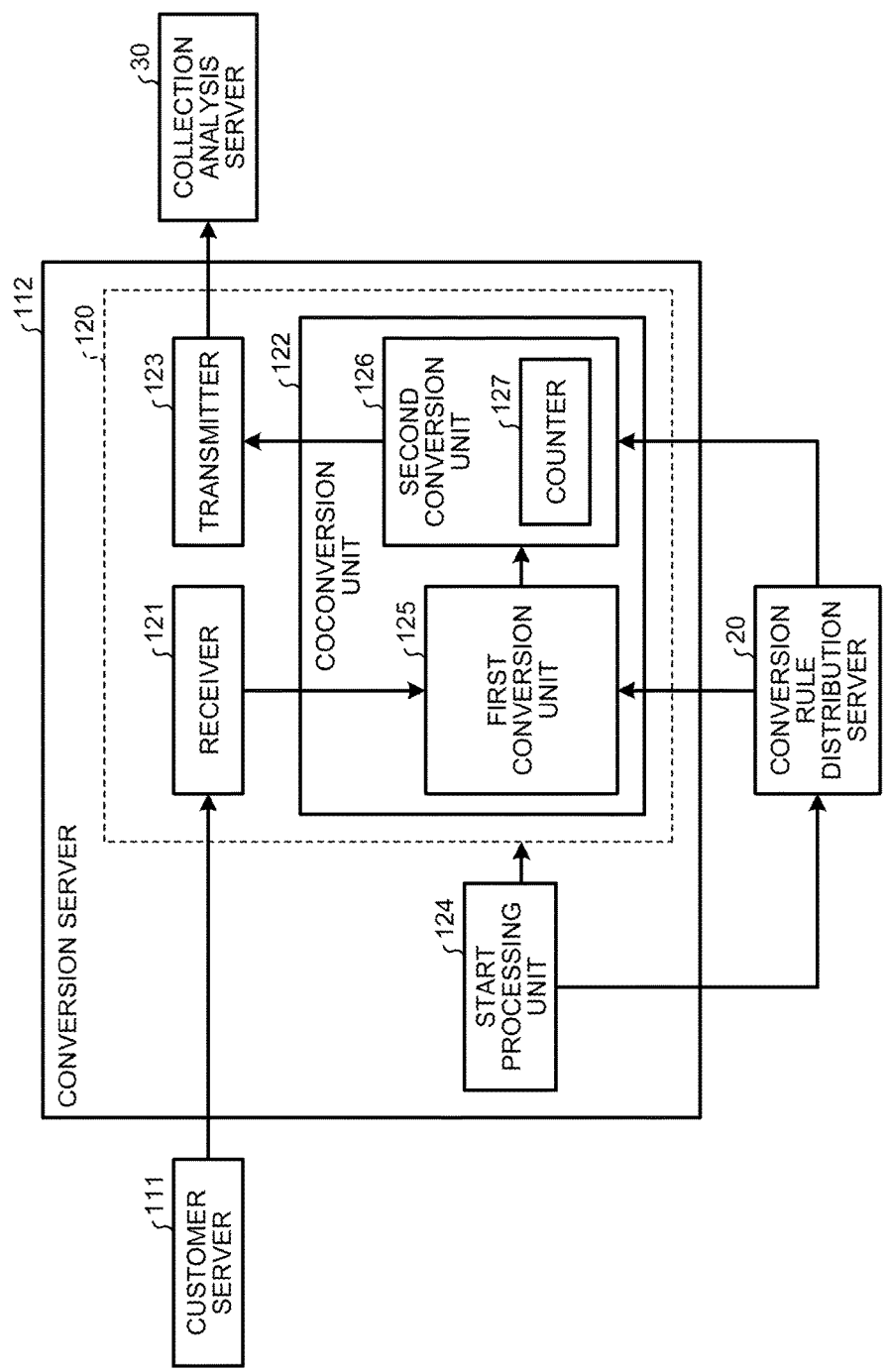
FIG. 2 is a block diagram of a conversion server according to the embodiment.

FIG. 2 is a block diagram of the conversion server according to the embodiment. As represented in FIG. 2, the conversion server 112 includes a receiver 121, a conversion unit 122, a transmitter 123, and a start processing unit 124.

The start processing unit 124 starts the conversion server 112. For example, the start processing unit 124 starts the receiver 121, the transmitter 123, and the conversion unit 122 that are surrounded by a dotted line 120. Once the conversion server 112 is started, the start processing unit 124 notifies a conversion rule distribution server 20 that the conversion server 112 is started.

The receiver 121 acquires the business operation data from the customer server 111. The receiver 121 outputs the acquired business operation data to a first conversion unit 125 of the conversion unit 122.

The conversion unit 122 converts the business operation data acquired from the customer server 111, i.e., the business operation data of the system of Company A, according to data unique to Company A. In other words, each of the conversion servers 112, 114 and 116 performs unique data conversion corresponding to its corresponding customer system. The details of the process performed by the conversion unit 122 will be described below. The conversion unit 122 includes the first conversion unit 125 and a second conversion unit 126.

The first conversion unit 125 regularly receives an input of a conversion rule from the conversion rule distribution server 20. The first conversion unit 125 holds the input conversion rule until the next acquisition of conversion rules. The conversion rule is common to all customers. The conversion rule may allow encryption or simple replacement. On each transmission from the conversion rule distribution server 20, a conversion rule defining a changed conversion method is transmitted.

The first conversion unit 125 receives an input of the business operation data of the system of Company A from the receiver 121. The first conversion unit 125 specifies, from among the business operation data on customers, information to be secreted from ones other than the customer as information to be converted. The information to be secreted is, for example, personal information, such as the name and address, and the company name. Specifically, the first conversion unit 125 specifies the information to be converted according a predetermined word and the position in the business operation data.

When conversion is simple replacement, the first conversion unit 125 determines whether there is a conversion rule on the information to be converted. When there is no conversion rule for the information to be converted, the first conversion unit 125 issues a request for generating a conversion rule to the conversion rule distribution server 20. The first conversion unit 125 then receives a conversion rule to which a new conversion rule for the current information to be converted is added from the conversion rule distribution server 20. Note that, when conversion, such as encryption, is performed, the first conversion unit 125 may omit the process of checking whether there is a conversion rule for the information to be converted.

The first conversion unit 125 converts the information to be converted among the business operation data according to the conversion rule held by the first conversion unit 125 and generates intermediate data. The first conversion unit 125 then outputs the generated intermediate data to the second conversion unit 126.

The intermediate data is data obtained by converting the business operation data according to the rule common to all customers. In other words, there is a possibility that one who knows the conversion rule for a customer would be able to restore the intermediate data to the business operation data before the conversion. In other words, the level of security of the intermediate data among customers is low.

The second conversion unit 126 includes a counter 127. The counter 127 servers as an exemplary "first counter". For example, the second conversion unit 126 manages the counter 127 by using a transmission information management table 128 represented in FIG. 3. FIG. 3 is a table of the exemplary transmission information management table. For example, as represented in FIG. 3, in the transmission information management table 128, the company name, the date of transmission, the counter value, and the data identifier are registered.

When the conversion server 112 is started, the second conversion unit 126 receives an input of an initial value of the counter value from the conversion rule distribution server 20. The second conversion unit 126 then registers the acquired initial value in a column of the counter value in the transmission information management table 128.

The second conversion unit 126 then receives an input of intermediate data from the first conversion unit 125. The second conversion unit 126 acquires the counter value from the transmission information management table 128. The second conversion unit 126 uses the acquired counter value to encrypt the intermediate data and generates conversion data.

The second conversion unit 126 then outputs the generated conversion data together with the company name, the data identifier, the date of transmission that are stored in the transmission information management table 128 to the transmitter 123. Furthermore, the second conversion unit 126 registers the value obtained by incrementing the current counter value by one in the transmission information management table 128 and updates the counter 127.

The counter value differs among the conversion servers 112, 114 and 116. In other words, the counter value differs with respect to each customer and is managed individually with respect to each customer by a corresponding one of the conversion servers 112, 114 and 116. For this reason, conversions different with respect to customers, respectively, are performed on the sets of conversion data obtained by encryption according to the counter values. For this reason, even if the counter value with respect to a customer is used, it is difficult to estimate the original business operation data from conversion data on another customer; therefore, the conversion data obtained by performing encryption according to the counter value ensures security between customers.

According to the embodiment, the counter value is used to perform a different data conversion with respect to each customer. Alternatively, another value may be used as long as the value allows a different conversion with respect to each customer and the value can be shared with the collection analysis server 30 as described below. Note that the value to be used by the second conversion unit 126 for encryption is preferably a variable. For example, the second conversion unit 126 may use random numbers to perform encryption.

The transmitter 123 receives an input of the data identifier and the conversion data from the second conversion unit 126. The transmitter 123 then transmits the conversion data generated from the business operation data of the system of Company A to the collection analysis server 30 together with the company name, the data identifier, and the date of transmission.

FIG. 1 will be referred back here to continue descriptions. The collection analysis server 30 receives the conversion data generated from the business operation data of the system of Company A, the company name, the data identifier and the date of transmission from the conversion server 112. The collection analysis server 30 then uses the counter value that the collection analysis server 30 has in advance to decrypt the conversion data and generates the intermediate data corresponding to the conversion data before the conversion. The collection analysis server 30 uses the intermediate data to perform identification on the information and uses the result of identification to analyze the information. The collection analysis server 30 then holds the result of analysis and issues a notification to the user. The collection analysis server 30 servers as an exemplary "data collecting apparatus". The details of the collection analysis server 30 will be described with reference to FIG. 4.

FIG. 4 is a block diagram of the collection analysis server according to the embodiment. As represented in FIG. 4, the collection analysis server 30 includes a receiver 301, an identification unit 302, a data analysis unit 303, and a database 304.

The receiver 301 receives, from the conversion server 112, the conversion data generated from the business operation data of the system of Company A, name of the company that possesses the business operation data from which the conversion data originates, data identifier of the conversion data, and date of transmission of the conversion data. The receiver 301 outputs the received conversion data, the company name, the data identifier, and the date of transmission to the identification unit 302.

The identification unit 302 performs identification on the conversion data acquired from the conversion servers 112, 114 and 116, i.e., the conversion data obtained by converting the business operation data on each customer. Different encryptions are performed with respect to respective customers. For this reason, it is difficult to specify sets of information that are identical in the conversion data and therefore the identification unit 302 restores the conversion data to the intermediate data and then performs identification. The details of the process performed by the identification unit 302 will be described below. The identification unit 302 includes an inverse transformation unit 321 and an identification processing unit 323.

The inverse transformation unit 321 includes a counter 322. The counter 322 is an exemplary "second counter". For example, the inverse transformation unit 321 manages the counter 322 according to a collected information management table 324 represented in FIG. 5. FIG. 5 is a table of the exemplary collected information management table. For example, as represented in FIG. 5, in the collected information management table 324, the company name, the date of transmission, the counter value, and the data identifier are registered with respect to each customer. In other words, the inverse transformation unit 321 manages the counter 322 with respect to each customer.

When the conversion server 112 is started, the inverse transformation unit 321 receives an input of an initial value of the counter value from the conversion rule distribution server 20. The inverse transformation unit 321 registers the acquired initial value in a column of the counter value in the collected information management table 324.

The inverse transformation unit 321 receives an input of the conversion data, the company name, the data identifier, and the date of transmission from the receiver 301. The inverse transformation unit 321 registers the date of transmission and the data identifier in an entry that matches in company name in the collected information management table 324.

The inverse transformation unit 321 then acquires the counter value in the entry that matches in company name in the collected information management table 324. The inverse transformation unit 321 uses the acquired counter value to decrypt the conversion data corresponding to the data identifier written in the same entry and generates the intermediate data corresponding to the data before the conversion. In other words, the inverse transformation unit 321 uses the counter value to decrypt the conversion data that is transmitted together with the data identifier.

The inverse transformation unit 321 then stores the generated intermediate data in the database 304. The inverse transformation unit 321 further registers the value obtained by incrementing the current counter value by one in the collected information management table 324 and updates the counter 322.

The identification processing unit 323 identifies information contained in the intermediate data accumulated in the database 304. In other words, the identification processing unit 323 specifies, as identical information, sets of information that match each other among the information contained in the intermediate data obtained by converting the business operation data according to the conversion rule.

The intermediate data referred herein is data obtained by converting the business operation data of the system on each customer according to the conversion rule common to all customers. For this reason, when sets of information originate from identical information, sets of intermediate information in the intermediate data have the same value. For this reason, using the intermediate data, the identification processing unit 323 is able to perform identification on the information in the business operation data before conversion to the intermediate data.

With reference to FIG. 6, the identification process performed by the identification processing unit 323 will be further described. FIG. 6 is a diagram for explaining the identification process performed by the identification processing unit. A table 401 is a table in which the business operation data of the system of Company A is registered. A table 402 is a table in which the business operation data of the system of Company B is registered. Company A is a company that runs convenience stores. Company B is a company that runs rental service businesses.

The purchaser information in the tables 401 and 402 is information to be secreted and converted. The identification processing unit 323 acquires intermediate data 431 in which data 412 on a purchaser in business operation data 411 is secreted as represented in the table 403. The identification processing unit 323 further acquires intermediate data 433 in which data 422 on the purchaser in business operation data 421 is secreted as represented in the table 403.

In this case, the data 412 is converted into "AAA" represented in data 432 according to the conversion rule. The data 422 is also converted into "AAA" represented in data 434 according to the conversion rule. Without restoring the intermediate data 431 and the intermediate data 433 to the business operation data 411 and the business operation data 412 before the conversion, the identification processing unit 323 knows that the data 432 in the intermediate data 431 and the data 434 in the intermediate data 433 are identical data. Accordingly, the identification processing unit 323 is able to perform identification on the information to be converted in the state where the information to be converted in the business operation data is kept secreted.

The identification processing unit 323 outputs the result of identification on the information in the intermediate data to the data analysis unit 303. For example, the identification processing unit 323 gathers sets of intermediate data having the identical information into a list and outputs the list to the data analysis unit 303.

The data analysis unit 303 receives an input of the result of identification performed by the identification processing unit 323. Using the intermediate data that is stored in the database 304 and the result of identification performed by the identification processing unit 323, the data analysis unit 303 analyzes the intermediate data. The data analysis unit 303 then outputs an analysis report 330 like that represented in FIG. 7 based on the result of analysis by using a printer or a monitor, and the analysis report 330 is provided to the user. FIG. 7 is a diagram representing the exemplary analysis report. The data analysis unit 303 performs an analysis according to the data represented in FIG. 6 and creates the analysis report 330.

In this case, from the sets of secreted information to be converted that are specified as identical, the data analysis unit 303 determines that the same person bought a rice ball at a convenience store and bought a digital versatile disk (DVD) at a rental video shop. From the age, gender, etc., of the person registered in the intermediate data, the data analysis unit 303 analyzes that a person who often buys a rice ball at a convenience store tends to buy a DVD at a rental video shop and provides the analysis report 330 in which the result of analysis is written to the user.

FIG. 1 will be referred back to continue descriptions. The conversion rule distribution server 20 receives start notifications from the conversion servers 112, 114 and 116. The case will be described here where the conversion rule distribution server 20 receives a start notification from the conversion server 112. The conversion rule distribution server 20 transmits an initial value of the counter value to the conversion server 112 and the collection analysis server 30. The conversion rule distribution server 20 regularly generates a conversion rule and transmits the generated conversion rule to the conversion servers 112, 114 and 116. Furthermore, the conversion rule distribution server 20 may transmit the latest conversion rules to the started servers when the conversion servers 112, 114 and 116 are started. When the conversion rule allows simple replacement, the conversion rule distribution server 20 receives requests for generating a rule on information to be converted from the conversion servers 112, 114 and 116. The conversion rule distribution server 20 then creates a rule on the specified information and transmits the conversion rule to which the created new rule is added to the requesting conversion servers. The details of the conversion rule distribution server 20 will be described with reference to FIG. 8.

Figure 8:
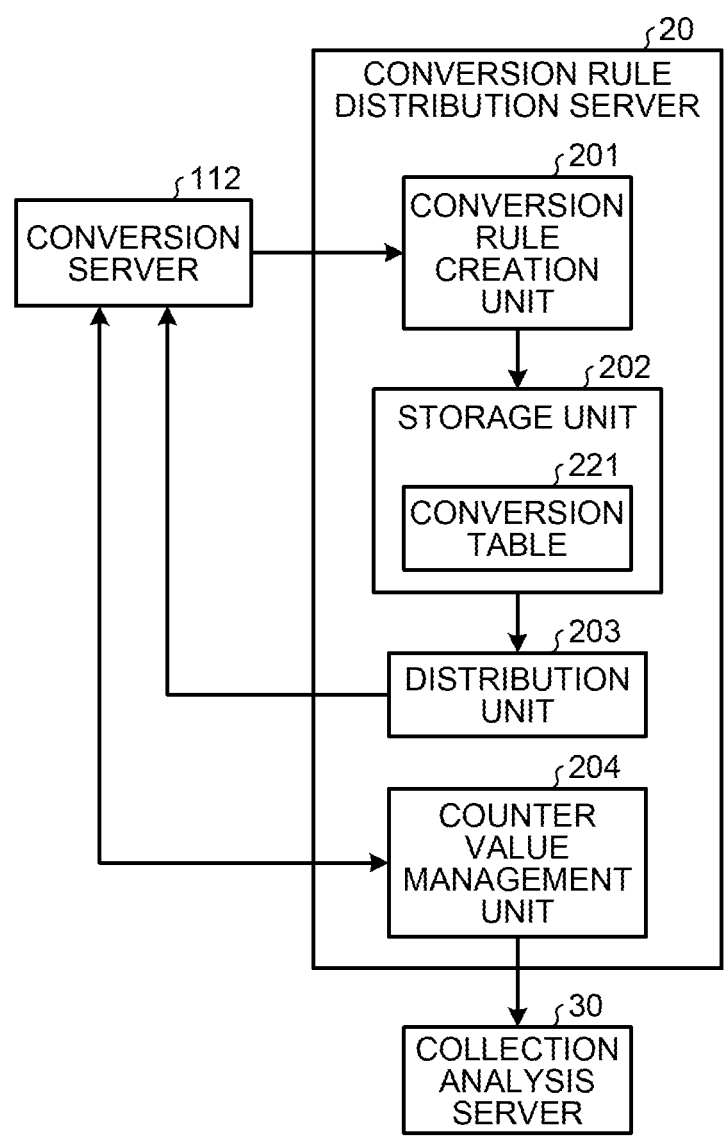
FIG. 8 is a block diagram of a conversion rule distribution server according to the embodiment.

FIG. 8 is a block diagram of the conversion rule distribution server according to the embodiment. As represented in FIG. 8, the conversion rule distribution server 20 includes a conversion rule creation unit 201, a storage unit 202, a distribution unit 203, and a counter value management unit 204.

The storage unit 202 stores a conversion table 221 in which the conversion rule is written.

The conversion rule creation unit 201 regularly updates the conversion rule written in the conversion table 221. When conversion is simple replacement, the conversion rule creation unit 201 receives a request for creating a rule together with the word to be converted from the conversion server 112. The conversion rule creation unit 201 then creates a rule on the word with respect to the request. The conversion rule creation unit 201 then adds the created rule to the conversion table 221 to update the conversion rule.

Once the conversion table 221 is updated by the conversion rule creation unit 201, the distribution unit 203 acquires the conversion rule for the conversion server 112 from the conversion table 221. The distribution unit 203 transmits the acquired conversion rule to the conversion server 112.

When the conversion server 112 is started, the counter value management unit 204 receives a start notification from the conversion server 112. Upon receiving the start notification, the counter value management unit 204 generates a new initial value of the counter value. The counter value management unit 204 then transmits the generated initial value of the counter value to the conversion server 112 and the collection analysis server 30.

Figure 9:
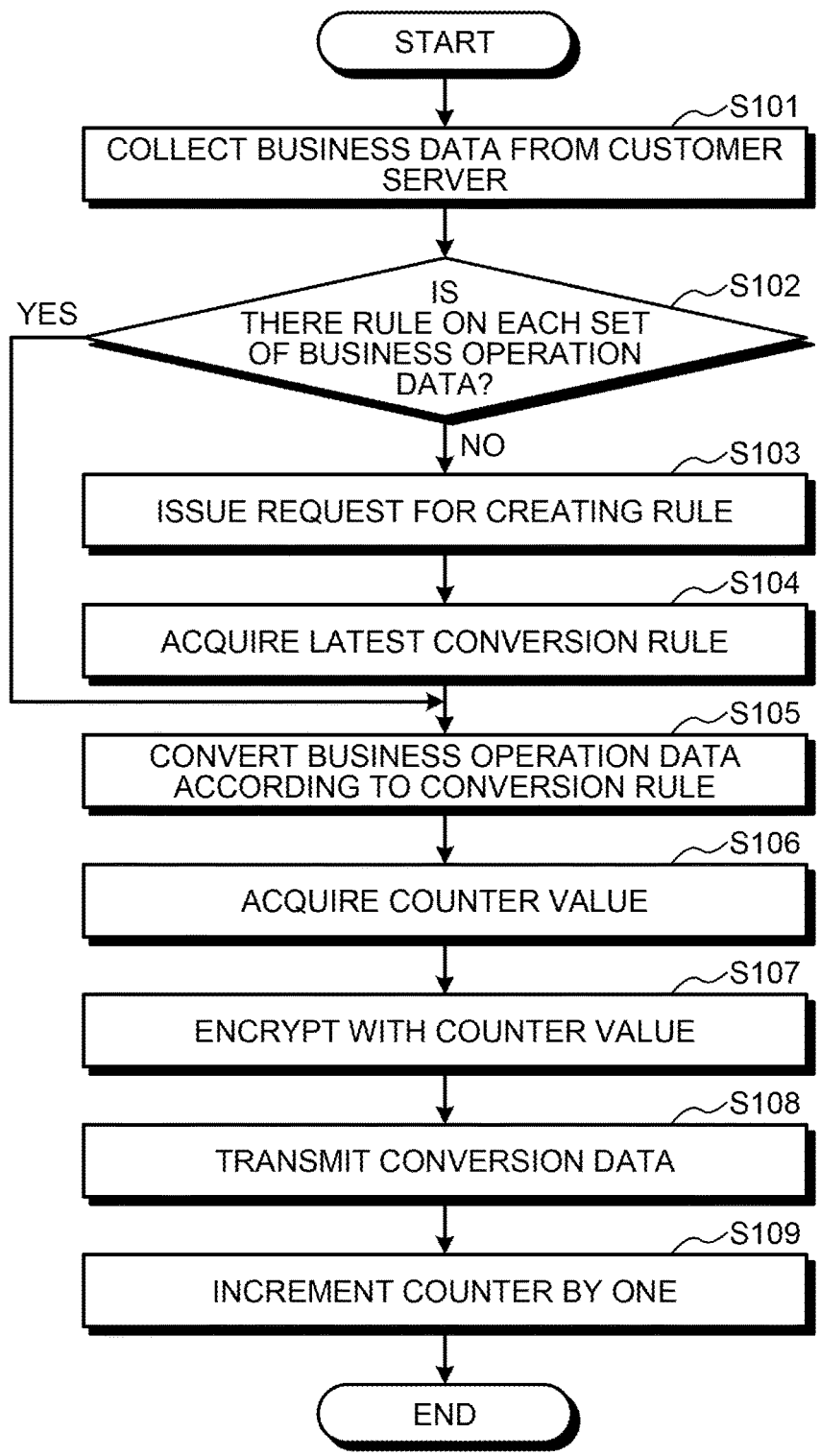
FIG. 9 is a flowchart of data conversion performed by a conversion server according to the embodiment.

With reference to FIG. 9, the flow of data conversion performed by the conversion server 112 according to the embodiment will be described. FIG. 9 is a flowchart of data conversion performed by the conversion server according to the embodiment. The case will be described where the conversion defined according to the conversion rules is simple replacement.

The receiver 121 collects business operation data from the customer servers 111, 113 and 115 (step S101). The receiver 121 outputs the collected business operation data to the first conversion unit 125.

The first conversion unit 125 receives an input of the business operation data from the receiver 121. The first conversion unit 125 determines whether there is a rule on each set of business operation data in the conversion rule that is acquired in advance from the conversion rule distribution server 20 (step S102). When there is a rule on each set of business operation data in the conversion rule (YES at step S102), the first conversion unit 125 goes to step S105.

On the other hand, when there is no rule on business operation data (NO at step S102), the first conversion unit 125 issues a request for creating a rule to the conversion rule distribution server 20 (step S103).

The first conversion unit 125 then acquires the latest conversion rule from the conversion rule distribution server 20 (step S104).

The first conversion unit 125 then converts the business operation data according to the held conversion rule and generates intermediate data (step S105). The first conversion unit 125 then outputs the intermediate data to the second conversion unit 126.

The second conversion unit 126 acquires the intermediate data from the first conversion unit 125. The second conversion unit 126 then acquires the counter value from the counter 127 (step S106).

The second conversion unit 126 uses the counter value to encrypt the intermediate data and generates conversion data (step S107).

The second conversion unit 126 then transmits the conversion data to the collection analysis server 30 (step S108).

Furthermore, the second conversion unit 126 increments the counter 127 by one (step S109).

Figure 10:
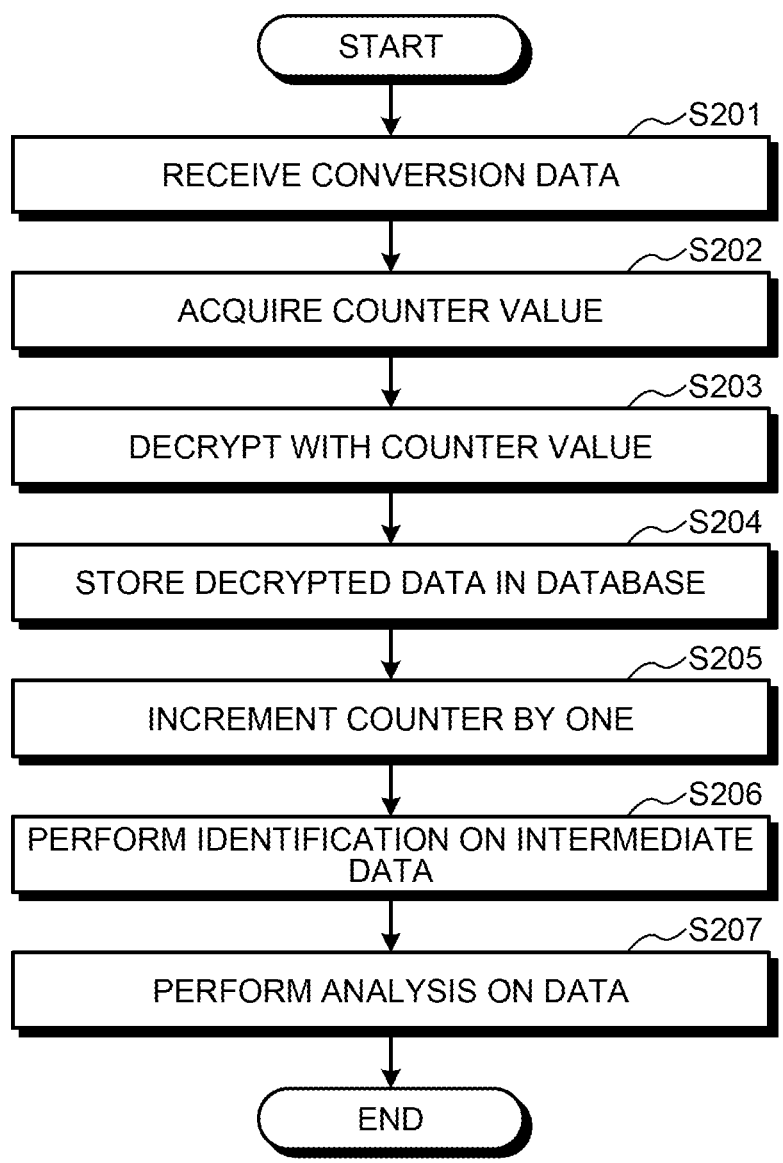
FIG. 10 is a flowchart of data acquisition performed by collection analysis server according to the embodiment.

With reference to FIG. 10, the flow of data acquisition performed by the collection analysis server 30 according to the embodiment will be described. FIG. 10 is a flowchart of the data acquisition performed by the collection analysis server according to the embodiment.

The receiver 301 receives the encrypted conversion data (step S201). The receiver 301 outputs the received conversion data to the inverse transformation unit 321.

The inverse transformation unit 321 receives input of the conversion data from the receiver 301. The inverse transformation unit 321 then acquires the counter value from the counter 322 (step S202).

The inverse transformation unit 321 uses the acquired counter value to decrypt the conversion data (step S203). In other words, the inverse transformation unit 321 acquires the intermediate data before encryption of the conversion data.

The inverse transformation unit 321 then stores the intermediate data obtained by decryption in the database 304 (step S204).

Furthermore, the inverse transformation unit 321 increments the counter 322 by one (step S205).

The identification processing unit 323 performs identification on the intermediate data stored in the database 304 at a given timing (step S206). The identification processing unit 323 then outputs the result of identification to the data analysis unit 303.

The data analysis unit 303 receives an input of the result of identification performed by the identification processing unit 323. Using the acquired result of identification, the data analysis unit 303 performs an analysis on the data stored in the database 304 (step S207).

Hardware Configuration

Figure 11:
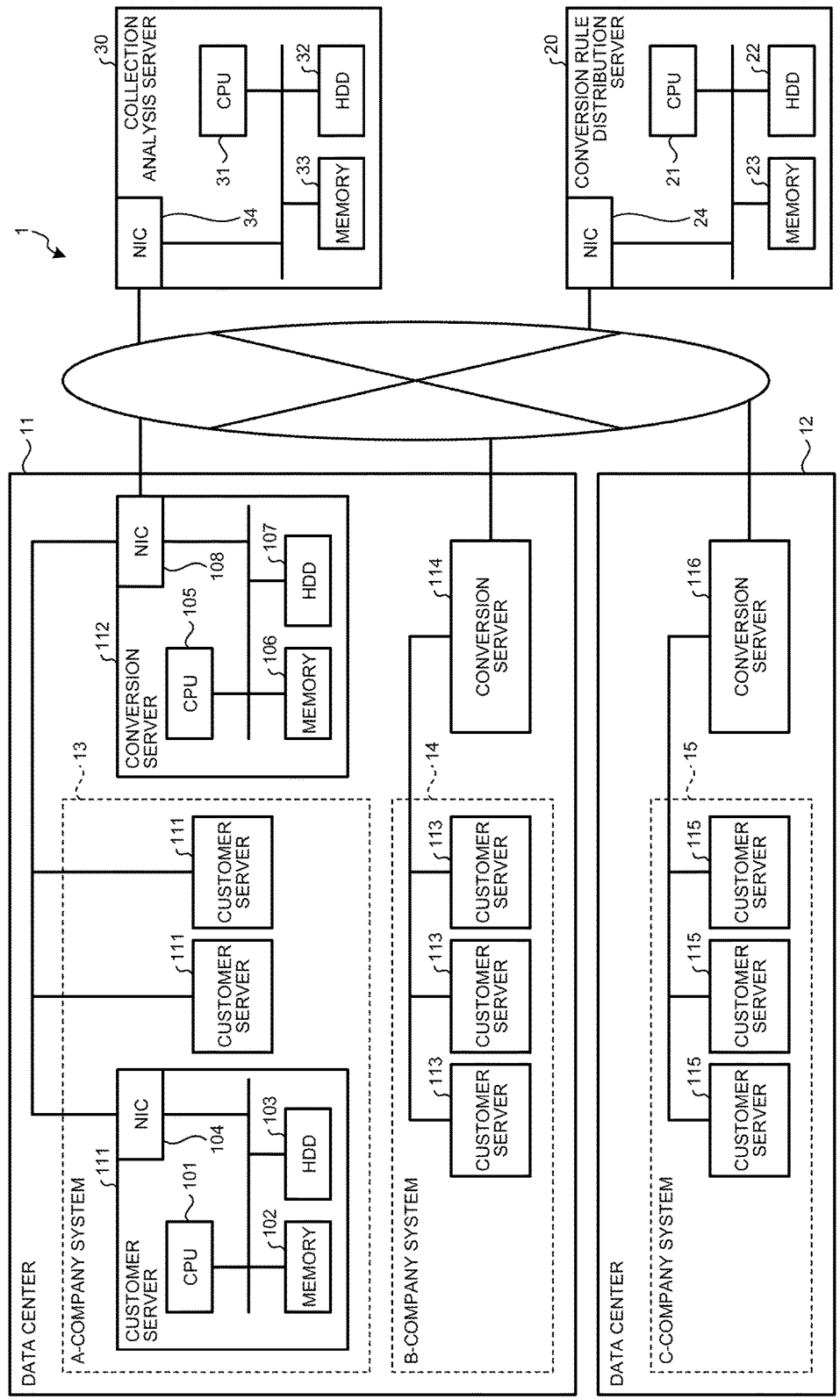
FIG. 11 is a hardware configuration diagram of the information processing system according to the embodiment.

With reference to FIG. 11, the hardware configuration of the customer servers 111, 113 and 115, the conversion servers 112, 114 and 116, the conversion rule distribution server 20, and the collection analysis server 30 will be described. FIG. 11 is a hardware configuration diagram of the information processing system according to the embodiment. According to FIG. 11, an A-company system 13 and a B-company system 14 are set in a data center 11. A C-company system 15 is set in the data center 12. Three customer servers 111 are set in the A-company system 13, three customer servers 113 are set in the B-company system 14, and three customer servers 115 are set in the C-company system 15. The customer server 111 will be exemplified here to describe the customer servers 111, 113 and 115.

The customer server 111 includes a CPU 101, a memory 102, a hard disc drive (HDD) 103, and a network interface controller (NIC) 104. The CPU 101 and the memory 102 store information that is input by an operator in the HDD 103 and provides the information stored in the HDD 103. The CPU 101 and the memory 102 transmit business operation data to the conversion servers 112, 114 and 116 via the NIC 104.

The conversion server 112 includes a CPU 105, a memory 106, a HDD 107 and a NIC 108. The NIC 108 is a communication interface between the conversion rule distribution server 20 and the collection analysis server 30. The NIC 108 implements the receiver 121 and the transmitter 123 exemplified in FIG. 2. The HDD 107 stores various programs and an operating system (OS) for implementing the conversion unit 122 and the start processing unit 124 exemplified in FIG. 2. The CPU 105 and the memory 106 implement the functions of the conversion unit 122 and the start processing unit 124 exemplified in FIG. 2. Specifically, the CPU 105 reads the various programs and the OS stored in the HDD 107, loads them in the memory 106, and executes them, thereby implementing the functions of the conversion unit 122 and the start processing unit 124. The memory 106 stores the transmission information management table 128, thereby implementing the function of the counter 127.

The collection analysis server 30 includes a CPU 31, a HDD 32, a memory 33, and a NIC 34. The NIC 34 is a communication interface between the collection analysis server 30 with the conversion servers 112, 114 and 116. The NIC 34 implements the receiver 301 exemplified in FIG. 4. The HDD 32 stores various programs for implementing the functions of the identification unit 302, the data analysis unit 303, and the database 304 illustrated in FIG. 2. The HDD 32 stores the data held by the database 304. The CPU 31 and the memory 33 impalement the functions of the identification unit 302, the data analysis unit 303, and the database 304 exemplified in FIG. 4. Specifically, the CPU 31 reads the various programs stored in the HDD 32, loads them in the memory 33, and executes them, thereby implementing the functions of the identification unit 302, the data analysis unit 303, and the database 304. The memory 33 stores the collected information management table 324, thereby implementing the function of the counter 322.

The conversion rule distribution server 20 includes a CPU 21, a HDD 22, a memory 23, and a NIC 24. The NIC 24 is a communication interface between conversion rule distribution server 20 and the conversion servers 112, 114 and 116. The HDD 22 stores various programs for implementing the functions of the conversion rule creation unit 201, the distribution unit 203, and the counter value management unit 204 exemplified in FIG. 8. The HDD 22 stores the conversion table 221 and implements the function of the storage unit 202. The CPU 21 and the memory 23 implement the functions of the conversion rule creation unit 201, the distribution unit 203, and the counter value management unit 204. Specifically, the CPU 21 reads the various programs stored in the HDD 22, loads them in the memory 23, and executes them, thereby implementing the functions of the conversion rule creation unit 201, the distribution unit 203, and the counter value management unit 204.

As described above, the conversion server according to the embodiment converts the business operation data acquired from the customer server into intermediate data according to the conversion rule common to all customers and then, using different encryptions with respect to respective customers, converts the intermediate data to generate conversion data. The collection analysis server decrypts the conversion data to restore the conversion data to the intermediate data, performs identification on the intermediate data, and analyzes the data. On transmission to the collection analysis server, security among customers is ensured, which ensures a higher security level. Furthermore, because the information to be secreted is kept secreted during the identification and analysis on the data, a higher security level can be ensured in those processes. Accordingly, it is possible to collect sets of information on multiple customers and perform identification while ensuring strengthened security.

According to an aspect of the embodiment of the information processing apparatus, the information processing system, and the information management method disclosed herein, an effect is achieved that it is possible to collect sets of information on multiple customers and perform identification while ensuring strengthened security.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system comprising:
a first information processing apparatus including:
a first memory; and
a first processor coupled to the first memory and configured to:
receive collected information from a plurality of information providing sources;
convert the collected information received from each of the information providing sources into intermediate data according to a common conversion rule, and convert the intermediate data to generate conversion data by using different encryptions;
a second information processing apparatus including:
a second memory; and
a second processor coupled to the second memory and configured to:
receive the conversion data converted by the common conversion rule from the first information processing apparatus and perform identification on information contained in each set of collected information in a state where, with respect to the received conversion data, information before the conversion is secreted, so that relevance among sets of collected information in the plurality of information providing sources is easily grasped even when information is secreted; and
a third information processing apparatus including:
a third memory; and
a third processor coupled to the third memory and configured to:
distribute a rule for conversion at a predetermined timing,
the first processor is further configured to:
convert the intermediate data into the conversion data by using information unique to the each information providing sources,
the second processor is further configured to:
restore the conversion data to the intermediate data before a conversion by using unique information corresponding to an information providing source of the collected information corresponding to the conversion data; and
perform identification on information contained in the each set of collected information by using the intermediate data generated,
the intermediate data is data obtained by converting the collected information of a system on each customer according to the conversion rule common to all customers,
when sets of information originate from identical information, sets of intermediate information in the intermediate data have the same value, and
the second processor is further configured to perform, by using the intermediate data, identification on the information in the collected information before conversion to the intermediate data,
the first processor is further configured to:
convert the intermediate data that is generated by the first converter from the collected information from a specific information providing source into the conversion data based on a value of a first counter corresponding to the specific information providing source and increment the first counter,
the second processor is further configured to:
match the first counter in initial value with respect to the each information providing source, convert the conversion data corresponding to the collected information from the specific information providing source into the intermediate data based on a value of a second counter corresponding to the specific information providing source and increment the second counter,
the value of the first counter and the value of the second counter differ with respect to each customer and are managed individually with respect to each customer by a corresponding one of first information processing apparatuses, and conversions different with respect to customers, respectively, are performed on sets of conversion data obtained by encryption according to the value of the first counter and the value of the second counter.

2. The information processing system according to claim 1, wherein the second processor is further configured to use the intermediate data to perform identification on the information and analyze, on the basis of a result of the identification, the each set of collected information in the state where the information before the conversion is secreted.

3. An information management method comprising:
receiving collected information from a plurality of information providing source;
converting the collected information received from each of the information providing sources into intermediate data according to a common conversion rule, and converting the intermediate data to generate conversion data by using different encryptions, by a first processor;
performing identification on information contained in each set of collected information in a state where, with respect to the generated conversion data, information before the conversion is secreted, so that relevance among sets of collected information in the plurality of information providing sources is easily grasped even when information is secreted, by a second processor; and
distributing a rule for conversion at a predetermined timing, by a third processor,
the first processor is further configured to:
convert the intermediate data into the conversion data by using information unique to the each information providing sources,
the second processor is further configured to:
restore the conversion data to the intermediate data before a conversion by using unique information corresponding to an information providing source of the collected information corresponding to the conversion data; and
perform identification on information contained in the each set of collected information by using the intermediate data generated,
the intermediate data is data obtained by converting the collected information of a system on each customer according to the conversion rule common to all customers,
when sets of information originate from identical information, sets of intermediate information in the intermediate data have the same value, and
the second processor is further configured to perform, by using the intermediate data, identification on the information in the collected information before conversion to the intermediate data,
the first processor is further configured to:
convert the intermediate data that is generated by the first converter from the collected information from a specific information providing source into the conversion data based on a value of a first counter corresponding to the specific information providing source and increment the first counter,
the second processor is further configured to:
match the first counter in initial value with respect to the each information providing source, convert the conversion data corresponding to the collected information from the specific information providing source into the intermediate data based on a value of a second counter corresponding to the specific information providing source and increment the second counter,
the value of the first counter and the value of the second counter differ with respect to each customer and are managed individually with respect to each customer by a corresponding one of first information processing apparatuses, and conversions different with respect to customers, respectively, are performed on sets of conversion data obtained by encryption according to the value of the first counter and the value of the second counter.

4. An information processing apparatus comprising:
a memory; and
a processor coupled to the memory and configured to:
receive collected information from a plurality of information providing sources;
convert the collected information received from each of the information providing sources into intermediate data according to a common conversion rule, and convert the intermediate data to generate conversion data by using different encryptions; and
transmit the generated conversion data to another information processing apparatus that receives the conversion data converted by the common conversion rule from the information processing apparatus and perform identification on information contained in each set of collected information in a state where, with respect to the received conversion data, information before the conversion is secreted, so that relevance among sets of collected information in the plurality of information providing sources is easily grasped even when information is secreted,
the information processing apparatus is further configured to:
convert the intermediate data into the conversion data by using information unique to the each information providing sources,
the another information processing apparatus is further configured to:
restore the conversion data to the intermediate data before a conversion by using unique information corresponding to an information providing source of the collected information corresponding to the conversion data; and
perform identification on information contained in the each set of collected information by using the intermediate data generated,
the intermediate data is data obtained by converting the collected information of a system on each customer according to the conversion rule common to all customers,
when sets of information originate from identical information, sets of intermediate information in the intermediate data have the same value, and
the another information processing apparatus is further configured to perform, by using the intermediate data, identification on the information in the collected information before conversion to the intermediate data,
the information processing apparatus is further configured to:
convert the intermediate data that is generated by the first converter from the collected information from a specific information providing source into the conversion data based on a value of a first counter corresponding to the specific information providing source and increment the first counter,
the another information processing apparatus is further configured to:
match the first counter in initial value with respect to the each information providing source, convert the conversion data corresponding to the collected information from the specific information providing source into the intermediate data based on a value of a second counter corresponding to the specific information providing source and increment the second counter,
the value of the first counter and the value of the second counter differ with respect to each customer and are managed individually with respect to each customer by a corresponding one of first information processing apparatuses, and conversions different with respect to customers, respectively, are performed on sets of conversion data obtained by encryption according to the value of the first counter and the value of the second counter.

\* \* \* \* \*